(12) United States Patent
Emens et al.

(10) Patent No.: US 6,591,279 B1
(45) Date of Patent: Jul. 8, 2003

(54) SYSTEM AND METHOD FOR COMPUTER-BASED NOTIFICATIONS OF REAL-WORLD EVENTS USING DIGITAL IMAGES

(75) Inventors: Michael Lawrence Emens, San Jose, CA (US); Reiner Kraft, Gilroy, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/298,217

(22) Filed: Apr. 23, 1999

(51) Int. Cl.⁷ .............................................. G06F 17/00
(52) U.S. Cl. ......................... 707/201; 707/6; 707/10; 709/219; 709/220
(58) Field of Search ................. 707/3, 4, 5, 6, 707/7, 2, 10, 100, 101, 201; 455/566; 348/14.12; 709/203, 219, 220; 715/505

(56) References Cited

U.S. PATENT DOCUMENTS

| | | | |
|---|---|---|---|
| 4,982,324 A | 1/1991 | McConaughy | |
| 4,994,788 A | 2/1991 | Philippe et al. | |
| 5,220,380 A | 6/1993 | Hirata et al. | |
| 5,315,711 A | 5/1994 | Barone et al. | |
| 5,539,479 A | 7/1996 | Bertram | |
| 5,602,597 A | 2/1997 | Bertram | |
| 5,606,374 A | 2/1997 | Bertram | |
| 5,761,071 A | 6/1998 | Bernstein et al. | |
| 5,781,550 A | 7/1998 | Templin et al. | |
| 5,791,992 A | 8/1998 | Crump et al. | |
| 5,802,518 A | 9/1998 | Karaev et al. | |
| 5,805,812 A | 9/1998 | Fish et al. | |
| 5,806,005 A * | 9/1998 | Hull et al. ................ | 348/14.12 |
| 5,826,122 A | 10/1998 | Shekel | |
| 5,838,906 A | 11/1998 | Doyle et al. | |
| 5,838,910 A | 11/1998 | Domenikos et al. | |
| 5,870,301 A | 2/1999 | Yakushiji et al. | |
| 5,898,780 A | 4/1999 | Liu et al. | |
| 5,898,835 A | 4/1999 | Truong | |
| 5,911,582 A | 6/1999 | Redford et al. | |
| 5,930,768 A | 7/1999 | Hooban | |
| 5,987,454 A * | 11/1999 | Hobbs ......................... | 707/10 |
| 6,029,195 A * | 2/2000 | Herz ............................ | 707/10 |
| 6,144,375 A * | 11/2000 | Jain et al. .................... | 345/420 |
| 6,169,989 B1 * | 1/2001 | Eichstaedt et al. ............. | 705/1 |
| 6,202,062 B1 * | 3/2001 | Cameron et al. ............ | 707/102 |
| 6,311,194 B1 * | 10/2001 | Sheth et al. ................. | 707/505 |
| 6,314,452 B1 * | 11/2001 | Dekel et al. ................. | 709/203 |

FOREIGN PATENT DOCUMENTS

TW 300368 3/1997

OTHER PUBLICATIONS

IBM Technical Disclosure Bulletin, vol. 38, No. 1, Jan. 1995, "Distributed object Encapsulation of Customer Information Control System Distributed Transaction Processing", pp. 177–180.

(List continued on next page.)

*Primary Examiner*—Majid Banankah
(74) *Attorney, Agent, or Firm*—Gates & Cooper LLP

(57) ABSTRACT

A method, apparatus, and article of manufacture for providing computer-based notifications of real world events over a network. The system includes client computers, proxy server computers, and device server computers. The proxy server computer receives notification profiles including both sensor conditions and associated actions from the client computers. The notification profiles are then stored in a user and profile database on the proxy server computer. The proxy server computer receives an indication from a sensor that a real world event has occurred, and then matches the received indication against the sensor conditions in the stored notification profiles. The associated actions are performed in response to a match between the received indication and the sensor conditions, wherein the associated actions include transmitting a notification message to one or more of the client computers and the notification message includes a digital image of the real world event.

54 Claims, 2 Drawing Sheets

OTHER PUBLICATIONS

IBM Technical Disclosure Bulletin, vol. 38, No. 9, Sep. 1995, "MPEG Menu Manager", pp. 291–295.

Goldberg et al., "Beyond the Web: Excavating the Real World Via Mosaic", http://www.usc.edu/dept/raiders/paper/, Oct. 17, 1994, 18 pages.

Goldberg et al., "The Telegarden",. http://telegarden.aec.at/, Jun. 1995, 2pp.

Goldberg et al, "About Telegarden", http://telegarden.aec.at/html/intro.html?, Aug. 1995, 3 pages.

(Abstract—1pp) T. Lumpp, G. Gruhler and W. Kuchlin, "Virtual Java Devices. Integration of Fieldbus Based Systems in the Internet", *IEEE: IECON '98 Proceedings of the 24$^{th}$ Annual Conference of the IEEE Industrial Electronics Society* (Cat. No. 98CH36200), Pt. vol. 1, pp. 176–181 vol. 1, published: New York, NY, USA, 1998, 4 vol. Xxix+2635 pp.

(Abstract—1pp) J.M. Puckett and L. Burczyk, "Remote Monitoring Using Technologies from the Internet and World Wide Web", *Annual Meeting of the Institute of Nuclear Materials Management (38$^{th}$)*, Phoenix, AZ, USA, Jul. 20–24, 1997. Sponsored by the Department o fEnergy, Washington, DC.

* cited by examiner

SYSTEM AND METHOD FOR COMPUTER-BASED NOTIFICATIONS OF REAL-WORLD EVENTS USING DIGITAL IMAGES

BACKGROUND OF THE INVENTION

1. Field of the Invention

The present invention generally relates to applications involving the Internet, and in particular, to a system and method for providing notification of real-world events over the Internet using digital images.

2. Description of Related Art

Currently, so-called push systems are broadly used in several Internet applications. Companies such as PointCast™ are dedicated to the development and enhancement of Internet push technologies. In addition, Microsoft introduced the notion of channels with its Internet Explorer Version 4, wherein channels allow people to subscribe to Web sites, news lists, and the like, and receive notification when certain events occur. For example, these events may be news or other updates, and the notifications may occur via channels or email.

In the prior art, however, these events are triggered when changes occur to stored digital content. For example, a user can subscribe to a notification service for stock prices. The user identifies a stock and/or price event trigger for such a notification service by filling out an electronic HTML form on the stock service's Web site. This information is then stored in a database by the stock service's Web site, and the user is later notified via emails generated by the stock service's Web site when the price of the identified stock increases or decreases. Of course, both the stock price and the event triggers are stored in digital form in the database by the Web site.

However, there are no known systems that provide computer-based notification services about "real world" events that are not based on changes to digital content. For example, a parent working at their office cannot be notified via the Internet that their baby is crying at home. Nonetheless, the advent of the Internet holds the promise for resolving these and other problems. More specifically, the present invention solves these problems by providing computer-based notifications of real world events using digital images.

SUMMARY OF THE INVENTION

To overcome the limitations in the prior art described above, and to overcome other limitations that will become apparent upon reading and understanding the present specification, the present invention discloses a method, apparatus, and article of manufacture for providing computer-based notifications of real world events over a network. The system includes client computers, proxy server computers, and device server computers. The proxy server computer receives notification profiles including both sensor conditions and associated actions from the client computers. The notification profiles are then stored in a user and profile database on the proxy server computer. The proxy server computer receives an indication from a sensor that a real world event has occurred, and then matches the received indication against the sensor conditions in the stored notification profiles. The associated actions are performed in response to a match between the received indication and the sensor conditions, wherein the associated actions include transmitting a notification message to one or more of the client computers and the notification message includes a digital image of the real world event.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
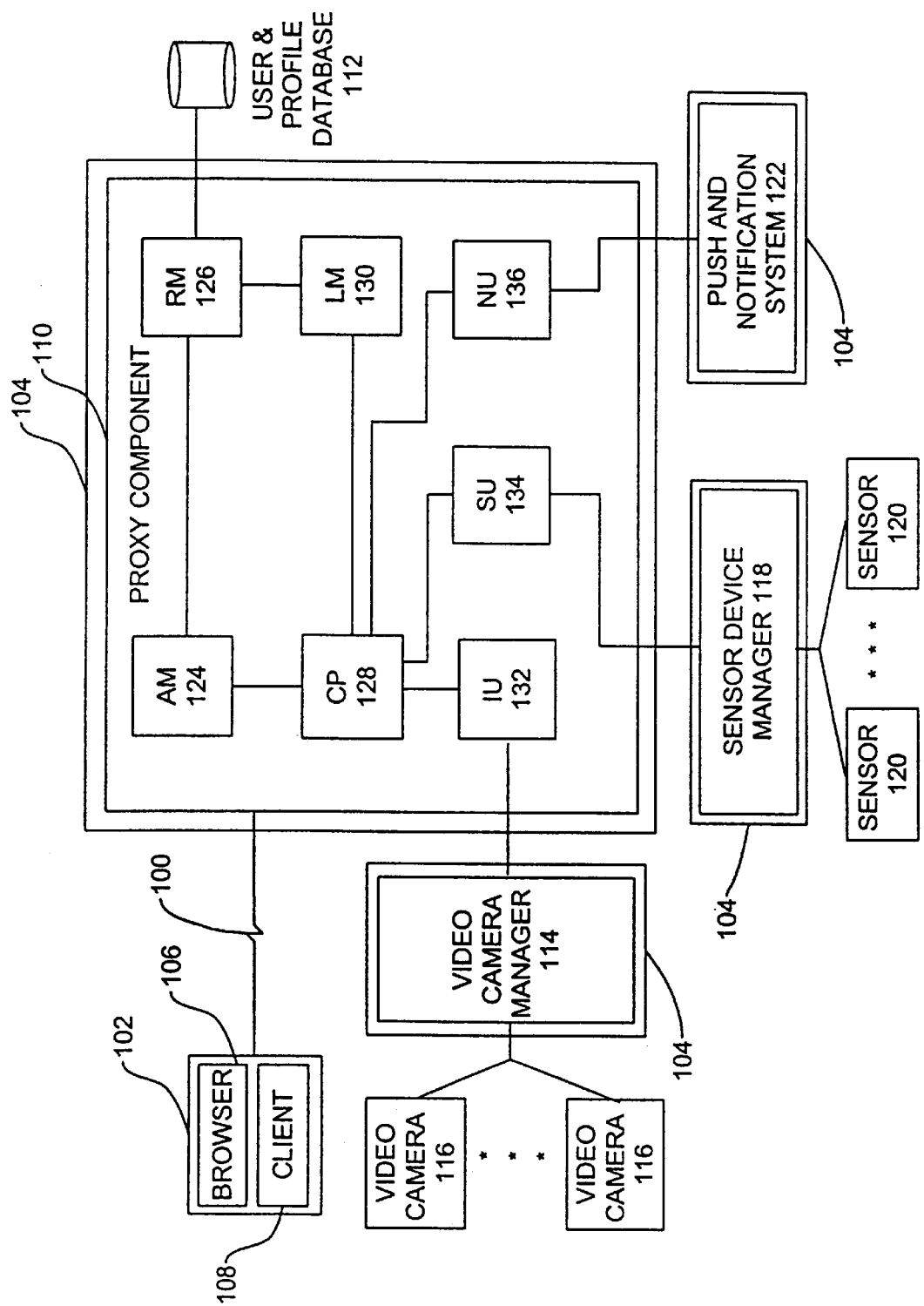
FIG. 1 is an exemplary hardware environment used to implement the preferred embodiment of the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention provides a system for computer-based notification about real world events, wherein the event triggers are specified from a Web client and the event notifications include a digital image of the real world events. Prior to the present invention, there was no effective way known for translating events in the real world, which is an analog domain, into events in the cyber world, which is a digital domain, and subsequently notifying remote users through a "push" type technology using digital images of the events. The present invention, on the other hand, translates these real world events into the digital domain and forwards a notice of such events to a predetermined set of users.

In the present invention, a real world event is not based on purely digital content. Instead, sensors are used to convert real world events into digital data, which can then processed using standard push technology systems. Additionally, the user is able to selectively identify the event trigger, and incorporate a selected digital image into the event notification. Generally, the digital image provides a visual record of the event being monitored by the sensor and the image is transmitted to the user with the notification message when the sensor indicates that the event has occurred.

Consider an example where a parent working at their office wants to be notified, via the Internet, when their baby is crying at home. An audio sensor would be placed at a remote location, i.e., in the baby's room at home. In addition, a camera would also be placed at the remote location. Both of these devices would be managed by a server and thus would be available to the parent via the Internet. Using the Web browser, the parent can specify a notification profile, i.e., sensor conditions (the audio sensor senses that the baby is crying) and associated actions (send the parent an urgent email including an image at a specified email address).

The notification profile is transmitted to and stored on the server, and then later used in a profile matching function that identifies input from a sensor, matches that input against one or more sensor conditions specified in one or more notification profiles, and then performs the desired actions specified by the notification profiles when the sensor conditions of the notification profiles are satisfied.

Of course, a video camera may provide both the sensor as well as the digital image, or the video camera may be used in conjunction with other sensors. Further, the video image would be available to users at any time using the Web browser, and thus can be accessed after receiving the email as well as during the configuration of the notification profile. In addition, during such configuration, the user can identify one or more areas of the image, and then associate the identified area with the sensor, so that the email message includes only that area of the digital image, which provides a visual record of the event that triggered the notification.

Hardware Environment

FIG. 1 schematically illustrates an exemplary hardware environment used in the preferred embodiment of the present invention. The present invention is implemented using a network 100 to connect one or more client computers 102 to one or more server computers 104. In this embodiment, one of the server computers 104 comprises a proxy server computer 104 that provides intermediate processing of commands for the remote device 106, others of the server computers 104 comprise device server computers 104 that control the video cameras, sensors, and/or other remote devices, and others of the server computers 104 comprise push server computers 104 that manage notification functions. A typical combination of resources may include client computers 102 that comprise personal computers or workstations, and server computers 104 that comprise personal computers, workstations, minicomputers, or mainframes. The network 100 connecting these computers may comprise the Internet, a LAN, a WAN, etc.

Generally, the present invention is implemented using one or more computer programs that are executed by the client computers 102 and/or server computers 104. In the exemplary embodiment of FIG. 1, these computer programs include: (1) a Web browser 106 and client coordinator 108 that are executed by the client computers 102; (2) a Proxy Component 110 executed by the proxy server computer 104 that manages a user and profile database 112; (3) a Video Camera Manager 114 executed by a first one of the device server computers 104 for managing video cameras 116; (4) a Sensor Device Manager 118 executed by a second one of the device server computers 104 for managing sensors 120; and (4) a Push/Notification System 122 executed by the push server computer 104. The Proxy Component 110 further includes sub-components or modules including an Authentication Manager (AM) 124, Resource Manager (RM) 126, Command Processor (CP) 128, Location Mapper (LM) 130, Image Unit (IU) 132, Sensor Unit (SU) 134, and Notification Unit (NU) 136.

Each of the computer programs comprise instructions which, when read and executed by their respective computers, cause the computers to perform the steps or elements of the present invention. The computer programs are usually embodied in or readable from a device, medium, or carrier, e.g., a local or remote data storage device or memory device coupled to the computer directly or coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs accessible from any device, medium, or carrier.

Of course, those skilled in the art will recognize that the exemplary environment illustrated in FIG. 1 is not intended to limit the present invention. For example, the functions of the proxy server computer 104, device server computers 104, and push server computer 104 could be performed by a single server computer 104. Moreover, a client/server architecture is not required, and the present invention could be completed implemented on a single computer, such as a workstation. Indeed, those skilled in the art will recognize that other alternative hardware environments may be used without departing from the scope of the present invention.

Operation of the Preferred Embodiment

The preferred embodiment of the present invention uses a number of novel components in its operations. These components are described in more detail below.

Web Browser and Client Coordinator

The client computer 102 executes a Web browser 106 that is able to run executable content (e.g., Java applets), which preferably comprises a client coordinator applet 108. These components provide a user interface to the functionality of the present invention. In the preferred embodiment, the user interface comprises a graphical user interface (GUI) that provides graphical images for both specifying notification profiles and for receiving notification messages. In addition, audio or other multimedia elements could be used to enhance the user's experience.

The client coordinator 108 allows the user to administer and manage user accounts for access control. The system can be used only after successful authentication of the identity. Generally, user management and authentication are well known in the art and existing systems can be easily integrated into the preferred embodiment.

In the preferred embodiment, the user uses the Web browser 106 to access the Web site to download and install the client coordinator 108. The Web browser 106 and client coordinator 108 allow the user to define notification profiles (sensor conditions and associated actions).

Proxy Component

The overall purpose of the Proxy Component 110 is to interact with the Web browser 106 and client coordinator 108, manage the user and profile database 112, interact with the Video Camera Manager 114, interact with the Sensor Device Manager 118, and interact with the Push and Notification system 122. The Proxy Component 110 is comprised of a number of sub-components, including an Authentication Manager (AM) 124, Resource Manager (RM) 126, Command Processor (CP) 128, Location Mapper (LM) 130, Image Unit (IU) 132, Sensor Unit (SU) 134, and Notification Unit (NU) 136.

The Authentication Manager (AM) 124 sub-component is responsible for authenticating users, granting access to the system, and managing user sessions. After successfully authentication, a user can interact with the system and can make use of the features described herein.

The Resource Manager (RM) 126 sub-component is responsible for managing the user and profile database 112. The Resource Manager (RM) 126 sub-component uses the database 112 to store information about users and notification profiles.

The Command Processor (CP) 128 sub-component is responsible for performing a profile matching function, using input signals from the sensors 120, to determine whether the sensors 120 are indicating that an "real world" event trigger has occurred, whether a notification profile condition has been satisfied, and whether the associated action should be performed.

The Location Mapper (LM) 130 sub-component is responsible for identifying the locations of cameras 116 associated with digital images, so that updated images may be obtained in response to an event trigger.

The Image Unit (IU) 132 sub-component is responsible for interfacing with the Video Camera Manager 114 to obtain the digital images.

The Sensor Unit (SU) 134 sub-component is responsible for interfacing with the Sensor Device Manager 118 to obtain sensor 120 signals.

The Notification Unit (NU) 136 sub-component is responsible for interfacing with the Push and Notification System 122 to transmit the notification messages.

Video Camera Manager

The Video Camera Manager 114 manages one or more video cameras (or digital still cameras) 116. Note that, in the preferred embodiment, the digital image is static and the camera 116 is not moving, although other embodiments may use moving images and cameras 116. Therefore, a mapping between a digital image and video camera 116 stored in a notification profile in the database 112 remains valid until either the defined notification profile is changed or the camera 116 is moved. In either case, the user has to manually update the notification profile to reflect the changes.

Sensor Device Manager

The Sensor Device Manager 118 manages one or more sensors 120. The sensors 120 generate signals in response to event triggers, wherein the signals are returned to the Sensor Unit 134. These event triggers can be sounds, light, or any other physical activity that can be detected by a sensor 120.

It is the user's (or system operator's) responsibility to place the sensors 120 in the correct location and to configure them correctly. For example, if the user wants to receive a notification about a light that is turned on, the user has to set up a sensor 120 so that it can detect the light being turned on.

Also, the user is responsible for associating the digital images with the correct sensors 120. For example, consider a scenario where the user has two sensors 120 in his house, wherein one sensor 120 is used to detect whether a light is switched on and another sensor 120 is used to detect whether a baby is crying. If the user associates the two sensors 120 with the wrong digital image, the system will not function correctly.

Push and Notification System

The Push and Notification System 122 generates the desired monocasts, multicasts, or broadcasts of the notification messages, depending upon the nature of the conditions being satisfied and the associated actions.

Logic of the Preferred Embodiment

Figure 2:
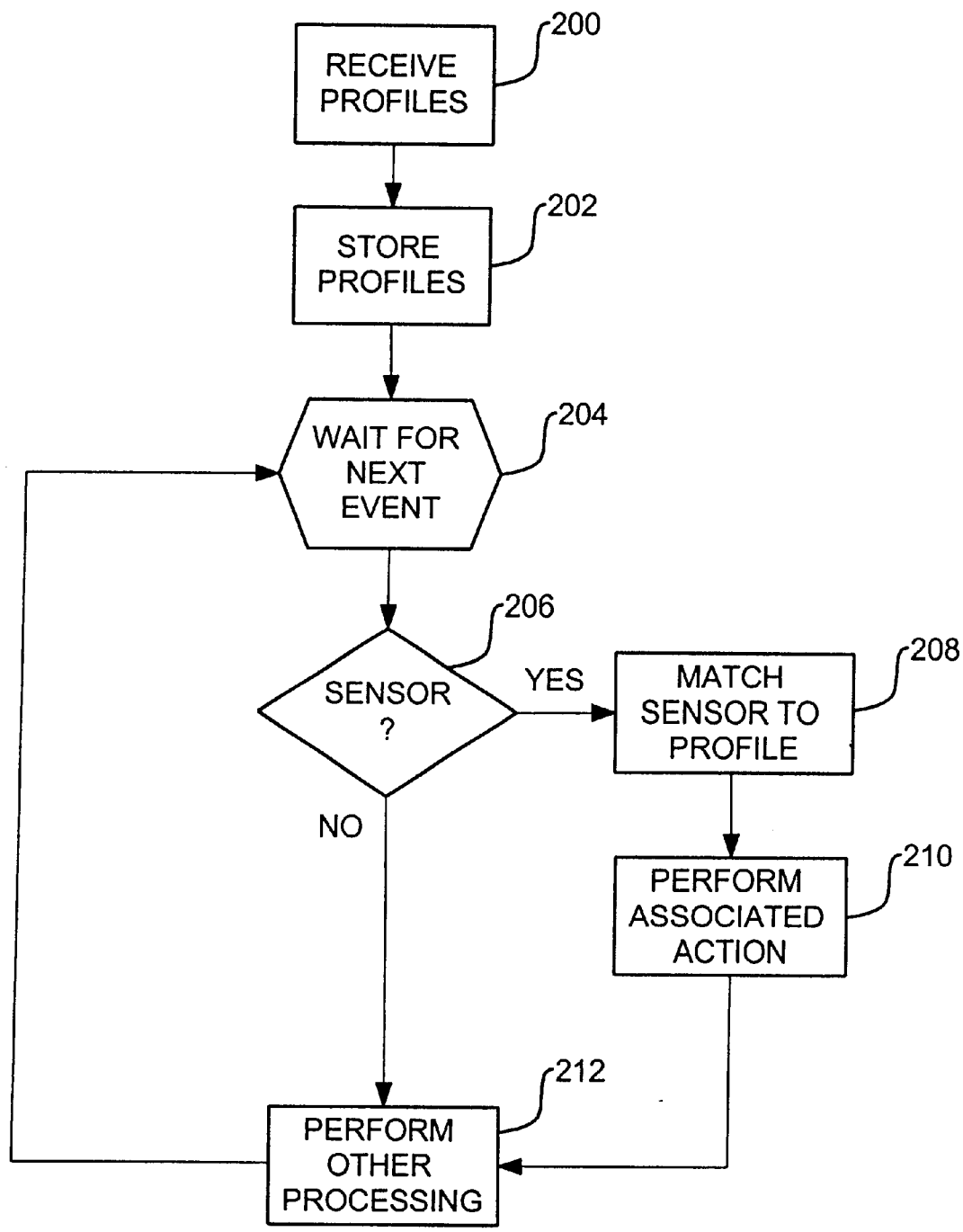
FIG. 2 is a flowchart that illustrates the general logic of the preferred embodiment of the present invention.

FIG. 2 is a flowchart that illustrates the general logic of the preferred embodiment of the present invention.

Block 200 represents the server computer 104 receiving one or more notification profiles including both sensor 120 conditions and associated actions from one or more client computers 102.

Block 202 represents the server computer 104 storing the notification profiles on the server computer 104.

Block 204 is a decision block that represents the server computer 104 waiting for the next event to occur.

Block 206 is a decision block that represents the server computer 104 determining whether the event is an indication from a sensor 120 that a real world event has occurred. If so, control transfers to Block 208; otherwise, control transfers to Block 212.

Block 208 represents the server computer 104 matching the received indication against the sensor 120 conditions in the stored notification profiles.

Block 210 represents the server computer 104 performing the associated actions in response to a match between the received indication and the sensor 120 conditions, wherein the associated actions include transmitting a notification message to one or more of the client computers 102 and the notification message includes a digital image of the real world event.

Block 212 represents the server computer 104 performing other processing.

CONCLUSION

This concludes the description of the preferred embodiment of the invention. The following describes some alternative embodiments for accomplishing the present invention.

For example, any type of sensor or camera could be used with the present invention. In addition, any type of computer configuration and/or network configuration could benefit from the present invention.

In summary, the present invention discloses a method, apparatus, and article of manufacture for providing computer-based notifications of real world events over a network. The system includes client computers, proxy server computers, and device server computers. The proxy server computer receives notification profiles including both sensor conditions and associated actions from the client computers. The notification profiles are then stored in a user and profile database on the proxy server computer. The proxy server computer receives an indication from a sensor that a real world event has occurred, and then matches the received indication against the sensor conditions in the stored notification profiles. The associated actions are performed in response to a match between the received indication and the sensor conditions, wherein the associated actions include transmitting a notification message to one or more of the client computers and the notification message includes a digital image of the real world event.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. system for providing computer-based notifications of real world events over a network, comprising:
   a server computer for receiving one or more notification profiles including both sensor conditions and associated actions from one or more client computers, for storing the notification profiles on the server computer, for receiving an indication from a sensor that a real world event has occurred, for matching the received indication against the sensor conditions in the stored notification profiles, and for performing the associated actions in response to a match between the received indication and the sensor conditions, wherein the associated actions include transmitting a notification message to one or more of the client computers and the notification message includes a digital image of the real world event.

2. The system of claim 1, wherein the digital image provides a visual record of the real world event.

3. The system of claim 1, further comprising means for allowing the user to associate the notification profiles with both sensors and digital images.

4. The system of claim 1, wherein the server computer further comprises an Authentication Manager (AM) sub-component that is responsible for authenticating users, granting users access to the system, and managing user sessions.

5. The system of claim 1, wherein the server computer further comprises a Resource Manager (RM) sub-component that is responsible for managing a database for storing the notification profiles.

6. The system of claim 5, wherein the Resource Manager (RM) sub-component uses the database to store information about the sensors.

7. The system of claim 5, wherein the Resource Manager (RM) sub-component uses the database to store information about the users.

8. The system of claim 1, wherein the server computer further comprises a Command Processor (CP) sub-component that is responsible for matching the received indication against the sensor conditions in the stored notification profiles to determine whether the sensors are indicating that the real world event occurred, whether one or more of the sensor conditions have been satisfied, and whether the associated action should be performed.

9. The system of claim 1, wherein the server computer further comprises a Location Mapper (LM) sub-component that is responsible for identifying one or more digital cameras associated with the digital images, so that updated versions of the digital images may be obtained for an associated action.

10. The system of claim 1, wherein the server computer further comprises an Image Unit (IU) sub-component that is responsible for interfacing with a Video Camera Manager to obtain the digital image.

11. The system of claim 10, wherein the Video Camera Manager manages one or more digital cameras.

12. The system of claim 1, wherein the server computer further comprises a Sensor Unit (SU) sub-component that is responsible for interfacing with a Sensor Device Manager to obtain the sensor indications.

13. The system of claim 12, wherein the Sensor Device Manager manages one or more sensors.

14. The system of claim 1, wherein the server computer further comprises a Notification Unit (NU) sub-component that is responsible for interfacing with a Push/Notification System to perform the associated actions.

15. The system of claim 14, wherein the Push/Notification System generates a notification message selected from a group comprising one or more monocast notification messages, one or more multicast notification messages, or one or more broadcast notification messages.

16. The system of claim 1, wherein the proxy server computer is coupled to the client computers over the Internet.

17. The system of claim 1, wherein the proxy server computer determines whether a user has sufficient access permissions.

18. The system of claim 1, wherein the client computers each execute a browser and a client coordinator that allows a user to specify the notification profiles.

19. A method for providing computer-based notifications of real world events over a network, comprising:
receiving one or more notification profiles including both sensor conditions and associated actions at a server computer from one or more client computers;
storing the notification profiles on the server computer;
receiving an indication at the server computer from a sensor that a real world event has occurred;
matching the received indication against the sensor conditions in the stored notification profiles at the server computer; and
performing the associated actions in response to a match between the received indication and the sensor conditions, wherein the associated actions include transmitting a notification message to one or more of the client computers and the notification message includes a digital image of the real world event.

20. The method of claim 19, wherein the digital image provides a visual record of the real world event.

21. The method of claim 19, further comprising allowing the user to associate the notification profiles with both sensors and digital images.

22. The method of claim 19, wherein the server computer further comprises an Authentication Manager (AM) sub-component that is responsible for authenticating users, granting users access to the system, and managing user sessions.

23. The method of claim 19, wherein the server computer further comprises a Resource Manager (RM) sub-component that is responsible for managing a database for storing the notification profiles.

24. The method of claim 23, wherein the Resource Manager (RM) sub-component uses the database to store information about the sensors.

25. The method of claim 23, wherein the Resource Manager (RM) sub-component uses the database to store information about the users.

26. The method of claim 19, wherein the server computer further comprises a Command Processor (CP) sub-component that is responsible for matching the received indication against the sensor conditions in the stored notification profiles to determine whether the sensors are indicating that the real world event occurred, whether one or more of the sensor conditions have been satisfied, and whether the associated action should be performed.

27. The method of claim 19, wherein the server computer further comprises a Location Mapper (LM) sub-component that is responsible for identifying one or more digital cameras associated with the digital images, so that updated versions of the digital images may be obtained for an associated action.

28. The method of claim 19, wherein the server computer further comprises an Image Unit (IU) sub-component that is responsible for interfacing with a Video Camera Manager to obtain the digital image.

29. The method of claim 28, wherein the Video Camera Manager manages one or more digital cameras.

30. The method of claim 19, wherein the server computer further comprises a Sensor Unit (SU) sub-component that is responsible for interfacing with a Sensor Device Manager to obtain the sensor indications.

31. The method of claim 30, wherein the Sensor Device Manager manages one or more sensors.

32. The method of claim 19, wherein the server computer further comprises a Notification Unit (NU) sub-component that is responsible for interfacing with a Push/Notification System to perform the associated actions.

33. The method of claim 32, wherein the Push/Notification System generates a notification message selected from a group comprising one or more monocast notification messages, one or more multicast notification messages, or one or more broadcast notification messages.

34. The method of claim 19, wherein the proxy server computer is coupled to the client computers over the Internet.

35. The method of claim 19, wherein the proxy server computer determines whether a user has sufficient access permissions.

36. The method of claim 35, wherein the client computers each execute a browser and a client coordinator that allows a user to specify the notification profiles.

37. An article of manufacture comprising a computer program carrier readable by a computer and embodying one or more instructions executable by the computer to perform method steps for providing computer-based notifications of real world events over a network, the method comprising:

receiving one or more notification profiles including both sensor conditions and associated actions at a server computer from one or more client computers;

storing the notification profiles on the server computer;

receiving an indication at the server computer from a sensor that a real world event has occurred;

matching the received indication against the sensor conditions in the stored notification profiles at the server computer; and performing the associated actions in response to a match between the received indication and the sensor conditions, wherein the associated actions include transmitting a notification message to one or more of the client computers and the notification message includes a digital image of the real world event.

38. The article of manufacture of claim 37, wherein the digital image provides a visual record of the real world event.

39. The article of manufacture of claim 37, further comprising allowing the user to associate the notification profiles with both sensors and digital images.

40. The article of manufacture of claim 37, wherein the server computer further comprises an Authentication Manager (AM) sub-component that is responsible for authenticating users, granting users access to the system, and managing user sessions.

41. The article of manufacture of claim 37, wherein the server computer further comprises a Resource Manager (RM) sub-component that is responsible for managing a database for storing the notification profiles.

42. The article of manufacture of claim 41, wherein the Resource Manager (RM) sub-component uses the database to store information about the sensors.

43. The article of manufacture of claim 41, wherein the Resource Manager (RM) sub-component uses the database to store information about the users.

44. The article of manufacture of claim 37, wherein the server computer further comprises a Command Processor (CP) sub-component that is responsible for matching the received indication against the sensor conditions in the stored notification profiles to determine whether the sensors are indicating that the real world event occurred, whether one or more of the sensor conditions have been satisfied, and whether the associated action should be performed.

45. The article of manufacture of claim 37, wherein the server computer further comprises a Location Mapper (LM) sub-component that is responsible for identifying one or more digital cameras associated with the digital images, so that updated versions of the digital images may be obtained for an associated action.

46. The article of manufacture of claim 37, wherein the server computer further comprises an Image Unit (IU) sub-component that is responsible for interfacing with a Video Camera Manager to obtain the digital image.

47. The article of manufacture of claim 46, wherein the Video Camera Manager manages one or more digital cameras.

48. The article of manufacture of claim 37, wherein the server computer further comprises a Sensor Unit (SU) sub-component that is responsible for interfacing with a Sensor Device Manager to obtain the sensor indications.

49. The article of manufacture of claim 48, wherein the Sensor Device Manager manages one or more sensors.

50. The article of manufacture of claim 37, wherein the server computer further comprises a Notification Unit (NU) sub-component that is responsible for interfacing with a Push/Notification System to perform the associated actions.

51. The article of manufacture of claim 50, wherein the Push/Notification System generates a notification message selected from a group comprising one or more monocast notification messages, one or mote multicast notification messages, or one or more broadcast notification messages.

52. The article of manufacture of claim 37, wherein the proxy server computer is coupled to the client computers over the Internet.

53. The article of manufacture of claim 37, wherein the proxy server computer determines whether a user has sufficient access positions.

54. The article of manufacture of claim 37, wherein the client computers each execute a browser and a client coordinator that allows a user to specify the notification profiles.

* * * * *